United States Patent [19]
Silva et al.

[11] Patent Number: 5,973,103
[45] Date of Patent: Oct. 26, 1999

[54] CONTINUOUS INTERFACIAL METHOD FOR PREPARING AROMATIC POLYCARBONATES

[75] Inventors: James Manio Silva, Clifton Park; Thomas Joseph Fyvie, Schenectady, both of N.Y.

[73] Assignee: General Electric Company, Schenectady, N.Y.

[21] Appl. No.: 09/177,023

[22] Filed: Oct. 22, 1998

[51] Int. Cl.$^6$ .............................. C08G 63/00; C08G 64/00
[52] U.S. Cl. ............................................ 528/196; 528/198
[58] Field of Search ...................... 528/196, 198

[56] References Cited

U.S. PATENT DOCUMENTS

| | | | |
|---|---|---|---|
| 5,011,966 | 4/1991 | Silva et al. | 558/268 |
| 5,043,203 | 8/1991 | Fyvie et al. | 528/198 |
| 5,359,117 | 10/1994 | Totani et al. | 558/268 |
| 5,380,814 | 1/1995 | Totani et al. | 528/199 |

*Primary Examiner*—Terressa Mosley
*Attorney, Agent, or Firm*—Noreen C. Johnson; Douglas E. Stoner

[57] ABSTRACT

Aromatic polycarbonates are prepared by a process which includes a continuous stage of oligomer preparation from a carbonyl halide such as phosgene and a dihydroxyaromatic compound such as bisphenol A, under interfacial conditions in the presence of an interfacial polycarbonate formation catalyst and an alkali metal hydroxide. The molar ratio of alkali metal hydroxide to carbonyl halide during oligomer preparation is up to 1.8:1, preferably in the range of about 1.45–1.8:1. The oligomeric intermediate product is then converted to high molecular weight polycarbonate having a low proportion of cyclic oligomers, which improves its thermodynamic stability.

29 Claims, No Drawings

CONTINUOUS INTERFACIAL METHOD FOR PREPARING AROMATIC POLYCARBONATES

BACKGROUND OF THE INVENTION

This invention relates to the interfacial preparation of aromatic polycarbonates, and more particularly to their preparation by a continuous method.

A well known method for polycarbonate preparation employs at least one dihydroxyaromatic compound, typically a bisphenol; a carbonyl halide, typically phosgene; a base, typically an alkali metal hydroxide, as an acid acceptor; a catalyst; and a substantially inert, substantially water-insoluble organic liquid such as methylene chloride. This method is frequently designated "interfacial" by reason of the interface existing between the distinct aqueous and organic phases.

Interfacial polycarbonate preparation has, by and large, been a batch process although numerous disclosures of continuous processes exist in the art. For example, U.S. Pat. No. 4,737,573 discloses a method adapted to continuous operation, wherein the first step is preparation of an intermediate product comprising polycarbonate oligomers, typically containing chloroformate end groups, in a tank reactor such as a continuous stirred tank reactor (CSTR). This intermediate product may then be converted to high molecular weight polycarbonate in one or, if necessary, two downstream reactors. The first such reactor may be another CSTR and the second may be a limited back-mixing reactor; i.e., one approaching plug flow conditions.

One advantage of batch operation over the years has been the freedom to change grades of polycarbonate manufactured by merely varying batch parameters. This is no longer as important a factor as it was, however, by reason of the alternative offered by redistribution according to U.S. Pat. No. 5,414,057; i.e., a single grade of polycarbonate can be converted by redistribution into other grades of varying molecular weights. Thus, continuous operation becomes more attractive as a commercial possibility.

Copending application Ser. No. 07/724,642 discloses a method for interfacial polycarbonate preparation which also involves an initial step of oligomer formation. The proportion of base (e.g., alkali metal hydroxide) employed therein is preferably equal to 2+4Y(Z−1) moles of base per mole of dihydroxy compound, wherein Y is in the range of about 0–0.5 and Z is the number of "moles of carbonic acid derivative per mole of dihydroxy compound"; i.e., the molar ratio of carbonyl halide to dihydroxyaromatic compound. By employing base in this proportion, it is allegedly possible to produce an oligomer intermediate having a weight average molecular weight (Mw) in the range of about 1,500–8,000 preferably about 1,500–4,000, which offers significant advantages.

U.S. Pat. No. 5,359,117 discloses a continuous method for interfacial polycarbonate preparation in which an essential feature is maintenance of the ratio of equivalents of base to dihydroxyaromatic compound in the range of 1.15–1.6. Such a ratio allegedly produces polycarbonate having a well regulated molecular weight distribution.

The molecular weight of the intermediate oligomer product unquestionably also has a significant effect on the properties of the high molecular weight polycarbonate ultimately formed in a continuous process. It has been found that if the oligomer molecular weight is too low, phosgenation efficiency may decrease, increasing raw material costs and necessitating very efficient scrubbing procedures to avoid discharge of very toxic phosgene into the atmosphere. In addition, low molecular weight oligomers tend to be less efficient at dissolving any unreacted dihydroxyaromatic compound, affording mixtures containing a solid phase which is difficult to process. On the other hand, oligomers of unduly high molecular weight produced in a continuous process can produce thermodynamically unstable polycarbonate products.

Therefore, there is a need for a continuous polycarbonate preparation method which is capable of producing an acceptable balance of phosgenation efficiency and thermodynamic stability in the final product.

SUMMARY OF THE INVENTION

The present invention is based in large part on the discovery that a major factor affecting thermodynamic stability of a continuously produced high molecular weight polycarbonate is the proportion of cyclic polycarbonate oligomers therein. Increasing the proportions of cyclic oligomers having degrees of polymerization below about 6 can have a very deleterious effect on thermodynamic stability. Moreover, the proportion of cyclic oligomers in the product has a direct relationship to the molecular weight of the oligomer intermediate.

This is in contrast to the production of high molecular weight polycarbonate from oligomers that are made via batch methods. In such processes, no relationship has been noted between cyclic oligomer content of the oligomeric intermediate and either molecular weight of the product polycarbonate or its thermodynamic stability. Thus, the discovery of such a relationship under continuous preparation circumstances is very unexpected.

It has further been discovered that there is a window of oligomer molecular weight which affords an optimum balance of phosgenation efficiency and thermodynamic stability in a continuous reaction. It has been further discovered that an oligomer intermediate within this window can be produced by maintaining a molar ratio of base to phosgene within a specific range.

Accordingly, the invention is a method for preparing an aromatic polycarbonate which comprises:

(A) conducting a first stage by continuously feeding of at least one dihydroxyaromatic compound and a carbonyl halide in the presence of water, an alkali metal hydroxide as acid acceptor, at least one interfacial polycarbonate formation catalyst and a substantially inert, substantially water-insoluble organic liquid, under back-mixing conditions while maintaining a molar ratio of alkali metal hydroxide to carbonyl halide at a value up to 1.8:1; and (B) passing said intermediate product to a second stage of said reaction wherein said intermediate product is converted into a final product comprising high molecular weight polycarbonate.

DETAILED DESCRIPTION; PREFERRED EMBODIMENTS

The dihydroxyaromatic compounds useful in the method of this invention include those of the formula $$HO—R—OH, \qquad (I)$$

wherein R is a divalent aromatic radical which may be an aromatic hydrocarbon or a substituted aromatic hydrocarbon radical, with illustrative substituents being alkyl, cycloalkyl, alkenyl (e.g., crosslinkable-graftable moieties such as allyl), halo (especially fluoro, chloro and/or bromo), nitro and alkoxy.

The preferred R values have the formula $$—A^1—Y—A^2—, \quad \text{(II)}$$

wherein each of $A^1$ and $A^2$ is a monocyclic divalent aromatic radical and Y is a single bond or a bridging radical in which one or two atoms separate $A^1$ from $A^2$. The free valence bonds in formula II are usually in the meta or para positions of $A^1$ and $A^2$ in relation to Y.

In formula II, the $A^1$ and $A^2$ values may be unsubstituted phenylene or substituted derivatives thereof wherein the substituents are as defined for R. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated $C_{1-12}$ aliphatic or alicyclic radical such as methylene, cyclohexylmethylene, [2.2.1]bicycloheptylmethylene, ethylene, ethylidene, 2,2-propylidene, 1,1-(2,2-dimethylpropylidene), cyclohexylidene, cyclopentadecylidene, cyclododecylidene or 2,2-adamantylidene, especially an alkylidene radical. Aryl-substituted radicals are included, as are unsaturated radicals and radicals containing atoms other than carbon and hydrogen; e.g., oxy groups. Substituents such as those previously enumerated may be present on the aliphatic, alicyclic and aromatic portions of the Y group.

Compounds containing radicals of formula II wherein Y is a bridging radical are classed as bisphenols. Illustrative bisphenols and other dihydroxyaromatic compounds for use in the invention are listed in the aforementioned U.S. Pat. No. 4,737,573, the disclosure of which is incorporated by reference herein. For the sake of brevity, the term "bisphenol" will frequently be employed hereinafter, but it should be understood that other dihydroxyaromatic compounds may be substituted for all or part of the bisphenol when appropriate.

The preferred bisphenols are those which are substantially insoluble in aqueous systems at temperatures within the range of 20–40° C. and pH values in the range of about 1–5. Thus, bisphenols of relatively low molecular weight and high solubility in water, such as resorcinol and hydroquinone, are generally less preferred. Bisphenol A (in which Y is isopropylidene and $A^1$ and $A^2$ are each p-phenylene) is often especially preferred for reasons of availability and particular suitability for the purposes of the invention.

Also useful are bisphenol-based compounds containing ester linkages. These may be prepared, for example, by reacting two moles of bisphenol A with one mole of isophthaloyl or terephthaloyl chloride.

A carbonyl halide (preferably phosgene), water and at least one substantially inert organic liquid are also employed in the method of the invention. The solubility of the bisphenol in the organic liquid is usually up to about 0.25 M at temperatures in the range of about 20–40° C., and preferably up to about 0.1 M. Said organic liquid should generally also be substantially insoluble in water. Illustrative liquids are aliphatic hydrocarbons such as hexane and n-heptane; chlorinated aliphatic hydrocarbons such as methylene chloride, chloroform, carbon tetrachloride, dichloroethane, trichloroethane, tetrachloroethane, dichloropropane and 1,2-dichloroethylene; aromatic hydrocarbons such as benzene, toluene and xylene; substituted aromatic hydrocarbons such as chlorobenzene, o-dichlorobenzene, the chlorotoluenes, nitrobenzene and acetophenone; and carbon disulfide. The chlorinated aliphatic hydrocarbons, especially methylene chloride, are preferred.

Also employed are an alkali metal hydroxide (hereinafter sometimes simply "base" for brevity) and at least one interfacial polycarbonate formation catalyst. The alkali metal hydroxide is most often sodium hydroxide but may also be, for example, potassium hydroxide or mixtures of sodium hydroxide and potassium hydroxide.

The catalyst may be a tertiary amine, typically a trialkylamine such as triethylamine or a highly nucleophilic heterocyclic amine such as 4-dimethylaminomorpholine, or a phase transfer catalyst, most often a quaternary ammonium salt such as tetra-t-butylammonium chloride or bromide or tetra-t-butylphosphonium chloride or bromide. Mixtures of such catalysts, especially mixtures of trialkylamines and tetraalkylammonium salts, may also be employed. However, in the oligomer formation step there is generally a decrease in phosgenation efficiency if a trialkylamine is employed as catalyst, either alone or in combination with a phase transfer catalyst. Therefore, the use of a phase transfer catalyst alone in this step is generally preferred.

In step A of the method of the invention, the first stage of the reaction is conducted continuously under back-mixing conditions. This is most often achieved with the use of a tank reactor, especially a CSTR. The temperature in step A is generally in the range of about 15–50° C.

In general, the feeds for the first stage comprise an organic solution, two aqueous solutions and a gas or optionally liquid feed. The organic solution, in the organic liquid employed, includes catalyst and, preferably, a chain termination agent, most often a monohydroxyaromatic compound such as phenol or p-cumylphenol. The two aqueous solutions comprise, in one case, base and bisphenol, the latter existing in the form of its alkali metal salt; and in the other case, aqueous base alone in a proportion to provide the molar ratio of base to phosgene prescribed herein. The gas or optionally liquid feed is phosgene.

Startup of the continuous first stage may be achieved in various ways. One is the preparation of an interfacial batch reaction mixture which is then phosgenated to a mole ratio of phosgene to bisphenol on the order of 0.8–0.9:1, after which the CSTR containing the batch reaction mixture is continuously fed with the organic and aqueous phases. This procedure may have the disadvantage of producing a transient oligomer species of undesirably high molecular weight (weight average, Mw, whenever used herein), sometimes as high as about 10,000, as a result of a residence time which is atypically long in comparison to steady state continuous conditions.

A preferred startup procedure is to charge the CSTR with an oligomer-containing reaction mixture typical of that from an earlier run. The two phases of an earlier mixture may thus be separated and the organic phase quenched with acid to inhibit further polymerization, and charged to the CSTR in combination with an aqueous brine (i.e., alkali metal halide solution, preferably sodium chloride) which may be the aqueous phase from an earlier reaction or a synthetically prepared brine of similar constitution.

The organic, aqueous and gas or optionally liquid feeds previously described are then introduced at substantially constant rates. Flow rates are adjusted to produce the desired proportions of constituents based on bisphenol during the continuous process, which are preferably as follows, based on dihydroxy compound:

carbonyl halide—about 104–120 mole percent;
catalyst—about 0.04–0.50 mole percent;
chain termination agent—about 3–7 percent.

A critical aspect of the invention is the molar ratio of base to phosgene. It is maintained at a value up to 1.8:1, preferably in the range of about 1.45–1.8:1 and most preferably in the range of about 1.6–1.8:1. Maintenance of this ratio in these ranges affords an intermediate oligomer product having a Mw up to about 6,000, preferably in the range of about 2,000–6,000 and most preferably in the range of about 4,000–6,000.

Thus, the proportion of base employed according to the invention is not, as in the prior art, calculated primarily to maintain an established pH set point, but rather to maintain an established molar ratio with respect to phosgene. This will inherently afford a pH during the oligomer-forming reaction within the range of about 7.5–10.5.

It should be noted that prior art procedures for preparing polycarbonate via oligomers may occasionally employ amounts of base which will produce a molar ratio to phosgene within the parameters prescribed herein. However, this is purely fortuitous and is not in any way, so far as can be determined, motivated by the desire to maintain said molar ratio within those parameters. The essential feature of this invention, on the other hand, is that such maintenance of said molar ratio is consciously planned and consistently followed.

The product of step A is a two-phase aqueous-organic intermediate product mixture containing the desired polycarbonate oligomers in combination with by-products such as alkali metal halide, typically sodium chloride. In step B, said mixture is passed to a second stage for conversion to a final product comprising high molecular weight polycarbonate.

The second stage may be conducted batchwise or continuously, in accordance with art-recognized procedures. Continuous conversion may employ a CSTR or similar back-mixed reactor, or a tube reactor of the type which usually operates under plug flow conditions. It is often preferred in the second stage to employ a catalyst mixture, especially a mixture of phase transfer catalyst with trialkylamine in the respective amounts of about 0.1–1.0 and 0.2–1.0 mole percent based on bisphenol.

A direct relationship was observed between the Mw of the oligomeric intermediate product and the proportion in the second stage product of cyclic oligomers, particularly those having degrees of polymerization from 3 to 6. These cyclic oligomers are apparently present in the oligomeric intermediate and are passed unchanged into the final product. As previously stated, such cyclic materials can decrease the thermodynamic stability of the polycarbonate product obtained with the use of a continuous oligomerization step. This is surprising, since a similar phenomenon has not been observed when the oligomeric intermediate is prepared by a batch process.

The aforementioned patents and application disclose ranges of various ratios which may on occasion afford a molar ratio of base to phosgene within the range of the present invention. However, the ratio employed in any run according to said patents and application may also fall outside that range, and there is no suggestion of such a range or of an advantage as a result of maintaining the ratio within it.

The method of this invention is illustrated by the following examples. All percentages are by weight unless otherwise indicated.

EXAMPLES 1–3

A CSTR having a volume in the range of 900–1,000 ml was fitted with a metered gas inlet for phosgene, three liquid inlets, a condenser, a stirrer and a pH probe. The CSTR was initially charged with an organic phase reaction mixture from the steady state portion of an earlier reaction and a synthetic brine phase. There were then added continuously (1) phosgene through the gas inlet and, through the liquid inlets, (2) an aqueous bisphenol A-sodium hydroxide solution, (3) a 50% aqueous sodium hydroxide solution and (4) an organic solution of tetra-n-butylammonium bromide (TBAB) and p-cumylphenol (PCP) in methylene chloride, with the temperature being maintained so as to cause reflux of the methylene chloride. The proportions of materials introduced were adjusted to provide in each example constant mole percentages of phosgene (104–110) and PCP (4.3–4.5) with respect to bisphenol A which, within these ranges, are not believed to materially affect the properties of the oligomeric intermediate product, and a constant mole percentage of TBAB with respect to bisphenol A in the range of abut 0.1–0.4. The residence time was 12 minutes, a constant molar ratio of sodium hydroxide to phosgene was maintained in each example and the phosgene flow rate was maintained at 5.9 or 6.6 g/min.

The effluents from the CSTR were analyzed for polycarbonate oligomer molecular weight and for phosgene by-products, principally carbonates. The CSTR was charged with additional TBAB as necessary and with triethylamine to afford molar ratios of bisphenol A to TBAB and triethylamine of 200:1 and 200–400:1, respectively. The molecular weight building reaction was conducted under reflux and under batch conditions simulating a plug flow reactor. The resulting high molecular weight polycarbonates were isolated by precipitation into acetone and analyzed by high pressure liquid chromatography for cyclic oligomers having degrees of polymerization in the range of 3–6.

The results are given in the following table. Phosgenation efficiency is the amount in moles of phosgene actually incorporated in the oligomers divided by the amount actually fed. The amount actually incorporated is calculated from the levels of chloroformate and hydroxy end groups in the oligomers, taking into consideration the proportion of chain termination agent present.

Comparison in the table is made with five controls (C1–5) run under similar conditions and a sixth control (C6) which was prepared under batch conditions, using 10% excess phosgene relative to bisphenol A.

| Example | TBAB, mole % | NaOH/phosgene mole ration | Phosgene flow rate, g/min | Polycarbonate oligomer Mw | Phosgenation efficiency | Cyclic Oliomers in polymer, % |
|---|---|---|---|---|---|---|
| 1 | 0.1 | 1.458 | 6.6 | 2,600 | 0.96 | 0.70 |
| 2 | 0.175 | 1.677 | 6.6 | 4,700 | 0.96 | 0.61 |
| 3 | 0.049 | 1.770 | 5.9 | 5,130 | 1.00 | 0.40 |
| C1 | 0.25 | 1.860 | 6.6 | 12,000 | 0.95 | 1.06 |

-continued

| Example | TBAB, mole % | NaOH/phosgene mole ration | Phosgene flow rate, g/min | Polycarbonate oligomer Mw | Phosgenation efficiency | Cyclic Oliomers in polymer, % |
|---|---|---|---|---|---|---|
| C2 | 0.201 | 1.960 | 5.9 | 15,760 | 0.99 | 0.90 |
| C3 | 0.395 | 1.959 | 5.9 | 16,510 | 0.99 | 1.00 |
| C4 | 0.099 | 1.978 | 5.9 | 18,770 | 0.99 | 1.10 |
| C5 | 0.25 | 1.918 | 6.6 | 19,200 | 0.94 | 2.12 |
| C6 | — | 2.6 | — | — | 0.91 | 0.82 |

It is apparent from the table that Examples 1–3, in which the molar ratio of base to phosgene was below 1.8:1 and specifically in the range of 1.45–1.8:1, afforded oligomers having molecular weights up to 6,000 and specifically within the desired range of 2,000–6,000. They also afford polycarbonate products having lower proportions of cyclic oligomers than Controls 1–5, in which higher ratios of base to phosgene were employed. A comparison of Examples 1–3 and Controls 1–5 with Control 6 shows the dependency of cyclic oligomer content on base to phosgene ratio in continuous but not in batch processes.

What is claimed is:

1. A method for preparing an aromatic polycarbonate which comprises:
    (A) conducting a first stage by continuously feeding of at least one dihydroxyaromatic compound and a carbonyl halide in the presence of water, an alkali metal hydroxide as acid acceptor, at least one interfacial polycarbonate formation catalyst and a substantially inert, substantially water-insoluble organic liquid, under back-mixing conditions while maintaining a molar ratio of alkali metal hydroxide to carbonyl halide at a value up to 1.8:1; and
    (B) passing said intermediate product to a second stage of said reaction wherein said intermediate product is converted into a final product comprising high molecular weight polycarbonate.
2. A method according to claim 1 wherein step B is conducted batchwise.
3. A method according to claim 1 wherein step B is conducted continuously.
4. A method according to claim 1 wherein step A is conducted in a continuous stirred tank reactor.
5. A method according to claim 4 wherein the temperature of step A is in the range of about 15–50° C.
6. A method according to claim 4 wherein there are fed to the reactor a solution of said catalyst in said organic liquid, an aqueous solution of said alkali metal hydroxide and said dihydroxyaromatic compound in the form of its alkali metal salt, and an aqueous solution of said alkali metal hydroxide, and said carbonyl halide.
7. A method according to claim 6 wherein the organic liquid is methylene chloride.
8. A method according to claim 6 wherein the alkali metal hydroxide is sodium hydroxide.
9. A method according to claim 6 wherein the dihydroxyaromatic compound has the formula $$HO—A^1—Y—A^2—OH,$$

wherein each of $A^1$ and $A^2$ is a monocyclic divalent aromatic radical and Y is a single bond or a bridging radical in which one or two atoms separate $A^1$ from $A^2$.

10. A method according to claim 9 wherein the dihydroxyaromatic compound is bisphenol A.

11. A method according to claim 6 wherein the carbonyl halide is phosgene.
12. A method according to claim 6 wherein the solution in said organic liquid further comprises a monohydroxyaromatic compound as chain termination agent.
13. A method according to claim 12 wherein the monohydroxyaromatic compound is p-cumylphenol.
14. A method according to claim 6 wherein the catalyst is a phase transfer catalyst which is a quaternary ammonium salt.
15. A method according to claim 14 wherein the quaternary ammonium salt is tetra-n-butylammonium bromide.
16. A method according to claim 12 wherein flow rates of the materials fed to the reactor are adjusted to produce the following proportions, based on dihydroxyaromatic compound:
    carbonyl halide—about 104–120 mole percent;
    catalyst—about 0.05–0.50 mole percent;
    chain termination agent—about 3–7 mole percent.
17. A method according to claim 16 wherein the molar ratio of alkali metal hydroxide to carbonyl halide is in the range of about 1.45–1.8:1.
18. A method according to claim 16 wherein the molar ratio of alkali metal hydroxide to carbonyl halide is in the range of about 1.6–1.8:1.
19. A method for preparing an aromatic polycarbonate comprising:
    (A) performing a first stage at a temperature between about 15 to about 50%, by continuously feeding at least one dihydroxyaromatic compound and phosgene in the presence of water, sodium hydroxide as acid acceptor, at least one phase transfer catalyst which is a quaternary ammonium salt, and methylene chloride, under back-mixing conditions while maintaining a molar ratio of sodium hydroxide to phosgene at a value up to 1.8:1, wherein the dihydroxyaromatic compound has the formula $$HO—A^1—Y—A^2—OH \qquad (I)$$

wherein each $A^1$ and $A^2$ is a monocyclic divalent aromatic radical and Y is a single bond or a bridging radical in which one or two atoms separate $A^1$ from $A^2$; and then
    (B) passing said intermediate product to a second stage of said reaction wherein said intermediate product is converted into a product comprising high molecular weight polycarbonate.
20. A method according to claim 19 wherein step B is conducted batchwise.
21. A method according to claim 19 wherein step B is conducted continuously.
22. A method according to claim 19 wherein step A is conducted in a continuous stirred reactor.

23. A method according to claim 22 wherein there are fed to the reactor a solution of said phase transfer catalyst in methylene chloride, an aqueous solution of sodium hydroxide and said dihydroxyaromatic compound in the form of its alkali metal salt, and an aqueous solution of sodium hydroxide and phosgene.

24. A method according to claim 19 wherein the dihydroxyaromatic compound is bisphenol A.

25. A method according to claim 23 wherein the solution in the organic liquid further comprises p-cumylphenol as a chain termination agent.

26. A method according to claim 19 wherein the quaternary ammonium salt is tetra-n-butylammonium bromide.

27. A method according to claim 25 wherein flow rates of materials fed to the reactor are adjusted to produce the following proportions, based on dihydroxyaromatic compound:

phosgene—about 104–120 mole percent;

phase transfer catalyst—about 0.04–0.50 mole percent;

p-cumylphenol—about 3–7 mole percent.

28. A method according to claim 27 wherein the molar ratio of sodium hydroxide to phosgene is in the range of about 1.45–1.8:1.

29. A method according to claim 28 wherein the molar ratio is in the range of about 1.6–1.8.1.

* * * * *